May 2, 1944.  G. B. CHRISTENSEN ET AL  2,347,665
INTERNAL REFLECTION LIGHTING MEANS
Filed March 4, 1941   3 Sheets-Sheet 2
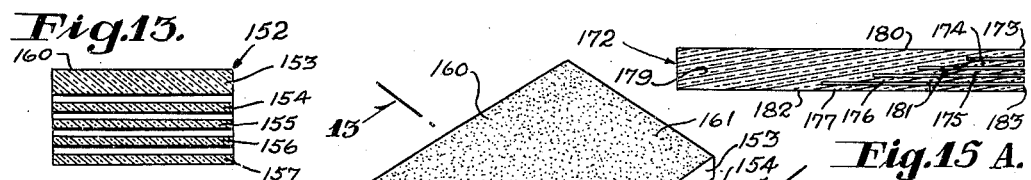
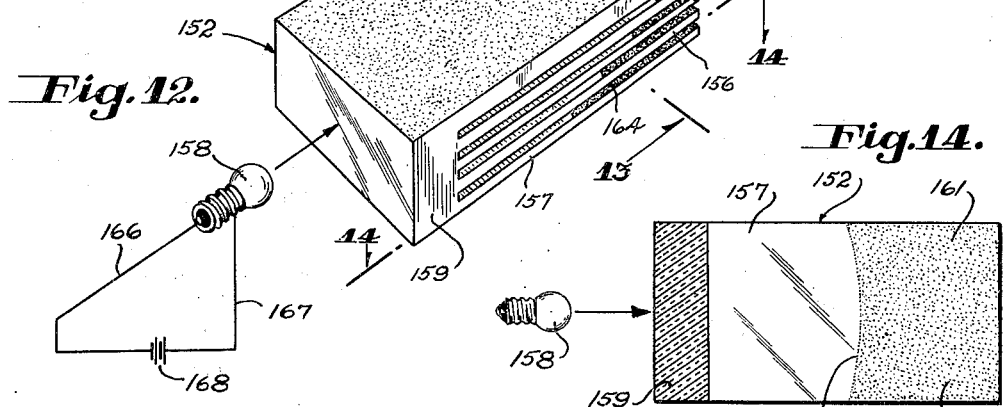
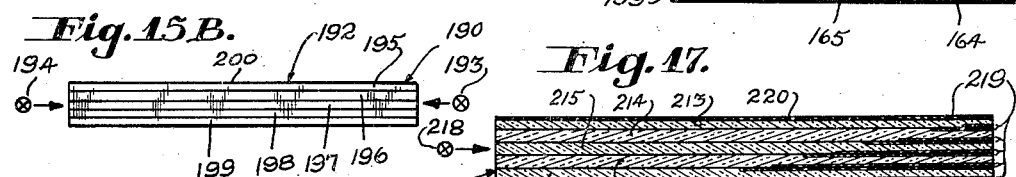
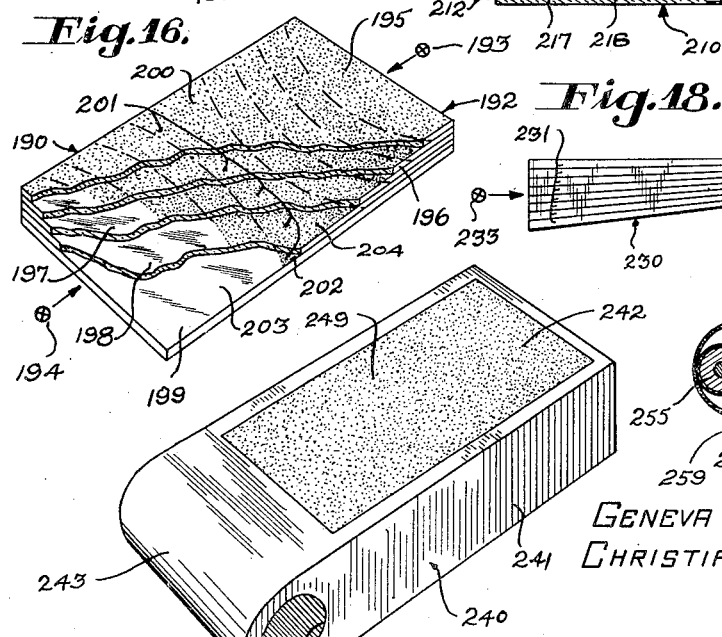
GENEVA BANDY CHRISTENSEN
CHRISTIAN CHRISTENSEN
INVENTORS
ATTORNEY

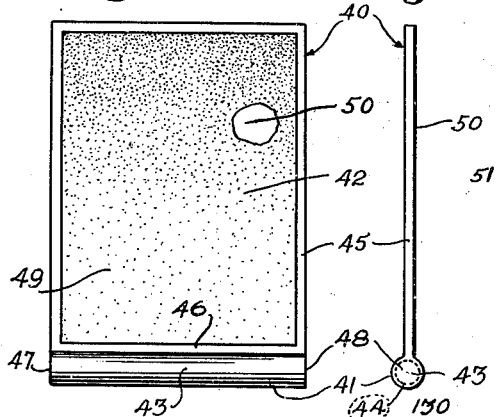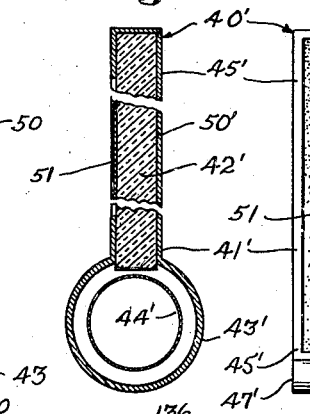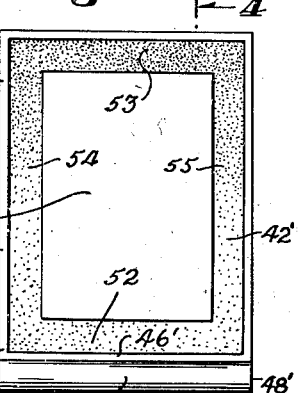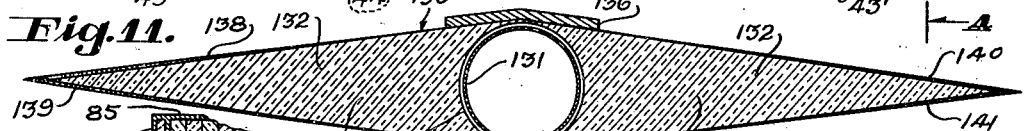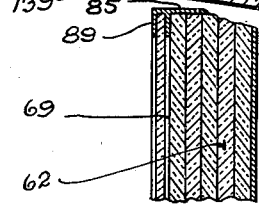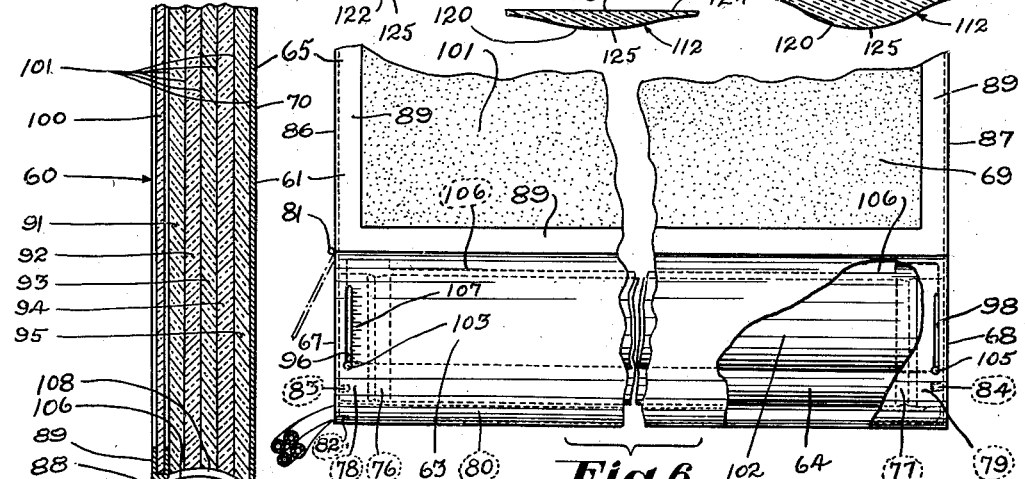

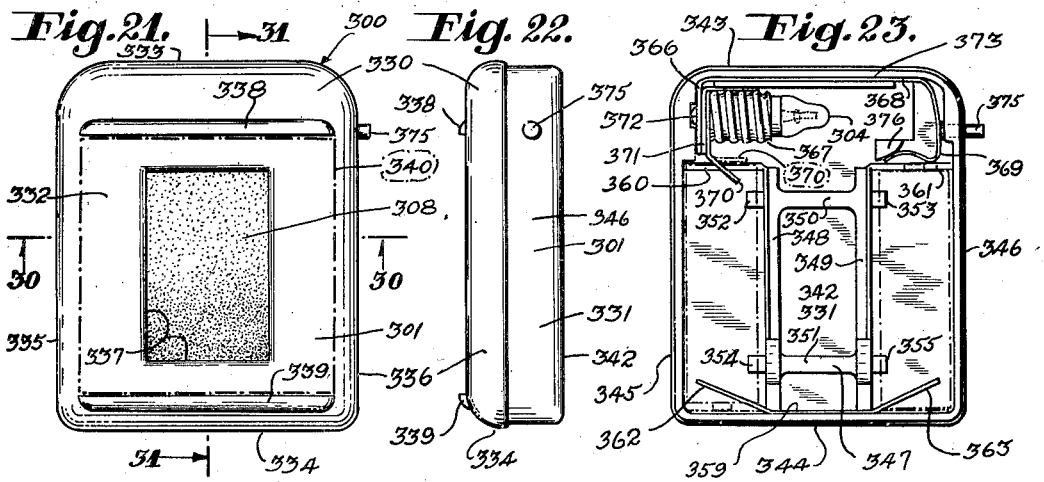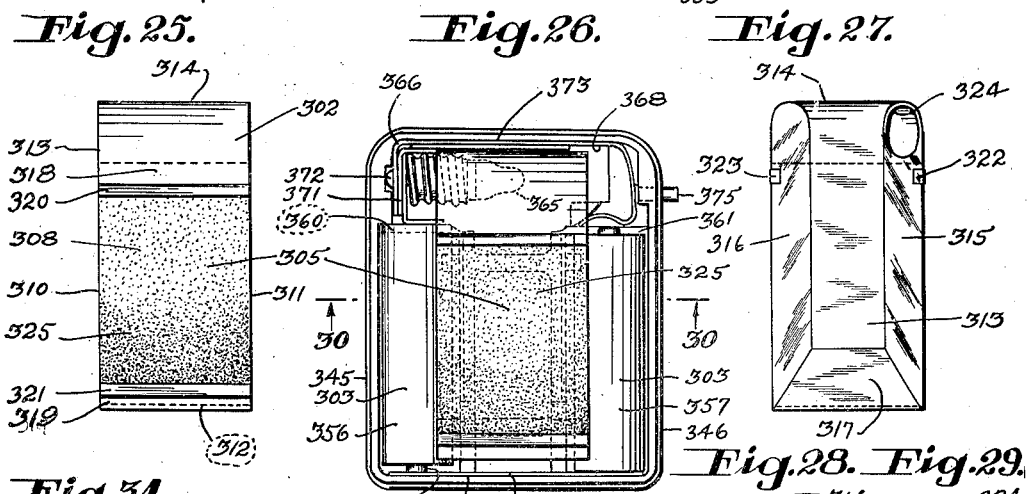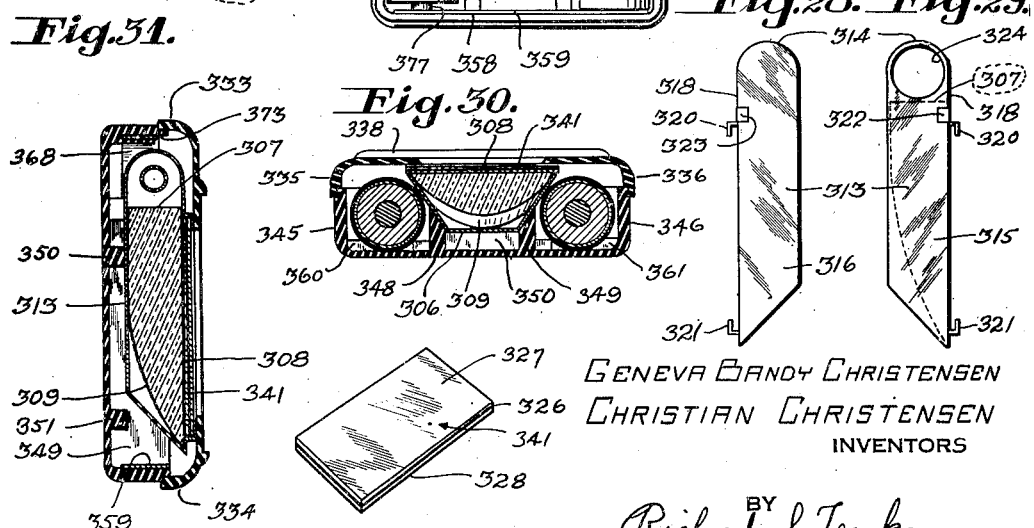

Patented May 2, 1944

2,347,665

UNITED STATES PATENT OFFICE 2,347,665

INTERNAL REFLECTION LIGHTING MEANS

Geneva Bandy Christensen and Christian Christensen, New Rochelle, N. Y.

Application March 4, 1941, Serial No. 381,702

1 Claim. (Cl. 240—2)

This invention relates generally to the field of illumination and, more particularly, to novel means for the dispersion of illumination from a relatively concentrated source.

In the lighting field there exists a multiplicity of devices in which a certain area requires illumination, and it is a primary requisite of such illumination that said area be uniformly illuminated all over. Examples of such devices are certain types of lighting fixtures, and certain viewing devices for use especially with transparencies such as scientific film, X-ray film, microphotographic film, and "Kodachrome" transparencies. Other devices in which a uniformly illuminated field is of primary importance, are so called retouching glasses, retouching tables, and retouching and spotting stands, finding principal use in the arts of photography, photolithography, color engraving and drafting. Still further devices, by way of examples, in which a so called "flat" or uniformly lit surface is of value, are various illuminating signs and displays used in advertising and merchandising fields.

While the problem of obtaining a relatively "flat" evenly illuminated area has been met by the use of certain reflectors, diffusing screens, and lens systems utilizing condensing units, these are open to the objection of being relatively complicated, bulky and expensive.

In accordance with the present invention, novel light dispersing means are disclosed in which an evenly illuminated area or field is obtained involving a minimum of space, weight and cost.

In connection with the use of "flat" field illumination, it is frequently a problem to control the intensity of the light. While for some classes of work, it is adequate to merely reduce the intensity of the light source, this is unsatisfactory in many other respects. Where the light source is an electric arc, it is difficult to accurately reduce the intensity of the arc without breaking it altogether. Since fluorescent tubes operate on a similar principle, here again control of intensity is confined to within impractically narrow limits. Where the light source is an incandenscent filament, reduction of the electrical current passing through the filament not only reduces the intensity of the illumination, but also materially alters its color range or spectrum, or color temperature.

It is an object of this invention to provide means for reducing the intensity of the illumination uniformly over a "flat" field without appreciably affecting the color range or spectrum thereof.

These objects and other incidental ends and advantages will more fully appear in the progress of this disclosure and be pointed out in the appended claim.

In the drawings forming a material part hereof, similar reference characters designate corresponding parts throughout the several views in each embodiment.

Figure 1 is a front elevational view of a first embodiment of the invention.

Figure 2 is an end elevational view of Figure 1.

Figure 3 is a front elevational view of a second embodiment of the invention.

Figure 4 is a fragmentary enlarged vertical sectional view of Figure 3 as seen from the plane 4—4 thereof.

Figure 5 is a central vertical sectional view of a third embodiment of the invention.

Figure 6 is a fragmentary front elevational view of the embodiment shown in Figure 5.

Figure 7 is a longitudinal sectional view of a fourth embodiment of the invention.

Figure 8 is a vertical sectional view as might be seen from the plane 8—8 on Figure 7.

Figure 9 is a vertical sectional view as might be seen from the plane 9—9 on Figure 7.

Figure 10 is a vertical sectional view as might be seen from the plane 10—10 on Figure 7.

Figure 11 is a central vertical sectional view of a fifth embodiment of the invention.

Figure 12 is a view in perspective, more or less diagrammatic, showing a sixth embodiment of the invention.

Figure 13 is a vertical sectional view, slightly reduced, as seen from the plane 13—13 on Figure 12.

Figure 14 is a horizontal sectional view as might be seen from the plane 14—14 on Figure 12.

Figure 15a is a side elevational view of a seventh embodiment of the invention.

Figure 15b is a side elevational view of an eighth embodiment of the invention.

Figure 16 is a view in perspective, with parts broken away, showing in greater detail the construction of the embodiment shown in Figure 15b.

Figure 17 is a central vertical sectional view, diagrammatic in nature, showing a ninth embodiment of the invention.

Figure 18 is a side elevational view of a tenth embodiment of the invention.

Figure 19 is a view in perspective of an illumination unit showing principally a casing adapted to contain one of the various forms of illumination dispersal units.

Figure 20 is a central horizontal sectional view of an eleventh embodiment of the invention. This figure is taken on a plane corresponding with Figure 30.

Figure 21 is a front elevational view of a twelfth embodiment of the invention.

Figure 22 is a side elevational view of Figure 21 as seen from the right side thereof.

Figure 23 is a front elevational view of the device shown in Figure 21 with the cover element and light dispersal unit removed.

Figure 24 is a view in perspective of a transparency adapted for use with the twelfth embodiment of the invention.

Figure 25 is a front elevational view of the light dispersal unit utilized in the twelfth embodiment.

Figure 26 is a view taken similarly to Figure 23 with the light dispersal unit of Figure 25 in its operating position therein.

Figure 27 is a rear elevational view of Figure 25.

Figure 28 is a side elevational view as seen from the left side of Figure 27 or the right side of Figure 25.

Figure 29 is a side elevational view as seen from the right side of Figure 27 and the left side of Figure 25.

Figure 30 is a horizontal sectional view as seen from the plane 30—30 on Figure 21 and corresponds to the plane 30—30 on Figure 26.

Figure 31 is a vertical sectional view as seen from the plane 31—31 on Figure 21.

Turning now to the first embodiment of the invention illustrated in Figures 1 and 2, the device, generally indicated by numeral 40, consists essentially of a casing 41 and a disperser 42.

The casing 41 includes an illuminator housing 43 which almost completely encloses the illuminator 44, and the disperser supporting frame 45.

The illuminator is preferably a fluorescent tube and the illuminator housing 43 is shaped to enclose the same. The fluorescent tube is preferably electrically energized in any known manner and the wires, auxiliaries and connections therefor are not shown in the drawings. The illuminator housing is preferably in the form of a hollow metallic cylinder having closed ends and an elongated slot. The disperser supporting frame 45 may take the form of a flat plate 50 which has the edge thereof bent to form a channel which is U-shaped in cross section. In the lower portion 46 of the frame 45, the bottom of the U is removed so that the lower portion 46 composed of two spaced parallel strips is attached to the illuminator housing 43 at the margin of the previously described slot therein. The attachment of the disperser supporting frame 45 to the illuminator housing 43 may be accomplished in any suitable manner, as for example, by soldering, so that the casing 41 forms a single unit. Obviously, one of the ends 47 or 48 may be removable so that the fluorescent tube may be replaced. The disperser in this embodiment is preferably formed of a planar sheet of light conducting material. Examples of such materials are glass, fused quartz and certain transparent plastic compositions, as for example, those sold under the trade-mark "Lucite." The disperser 42 is preferably as wide as the slot in the housing 43 which is, in turn, preferably of the same length as the fluorescent tube. The disperser supporting frame is preferably of such a size as to engage the disperser 42 at all of the edges thereof.

The internal surfaces of the disperser supporting frame are preferably coated with a material of a high light reflecting quality, as for example, white paint. The disperser has the front and rear surfaces thereof roughened or ground so that said surfaces have the appearance of ground glass or glass which has been frosted by exposure to hydrofluoric acid fumes. The thickness of the disperser may be varied between considerable limits. Since the disperser 42 is essentially a light conducting medium, if the same is too thin, insufficient light will be carried thereby, while if the same is considerably thicker than the width of the source of illumination, a certain amount of inefficiency will result. When light emerges from the fluorescent tube, it is reflected or directly cast upon the lower edge (as seen in the Figures 1 and 2) of the disperser. Such light is then conducted upwardly as well as angularly within the disperser. It is only made visible, that is, projected perpendicularly from the front face 49 of the disperser 42 when said light is deflected or reflected by meeting a reflecting or refracting surface in the disperser. These reflecting and refracting surfaces are formed by the aforesaid roughened surfaces upon the disperser.

After the light enters the edge of the disperser, assuming the disperser to be composed of a medium having a 100% light transmitting efficiency, as the light travels away from the light entering edge, the same will loose intensity in accordance with the well known formula and inversely as the square of the distance which the light travels. As a practical matter, this means that the front surface or face 49 of the disperser 42 will glow or emit a glow which is brighter at the lower edge thereof and is reduced in intensity to the upper edge thereof. In accordance with the present invention, this tapering off of light value is compensated for by having a greater amount of light reflecting or refracting surfaces located at the upper portion of the disperser 42, that is to say, that portion which is most removed or distant from the light source, namely the fluorescent tube 43. In order that the light or glow emitted by the disperser from the front surface 49 may be substantially uniform thereover, the grinding or roughening of the disperser's surfaces is graduated so that the amount of roughening gradually increases with the distance from the light source. By properly graduating said roughening, substantially complete compensation may be had so that the entire exposed area of the front face 49 may emit a glow of uniform intensity. The light picked up by the roughness of the front face 49 is substantially directly reflected to the person viewing the device, while that picked up by the roughness on the rear surface is either directly reflected forwardly or is cast upon the inner white surface of the frame 45 and is then reflected therefrom again through the disperser to be emitted thereby generally perpendicularly from said front surface. A considerable amount of light is reflected from the inner surface of the rear plate or wall 50.

It may thus be seen that an extremely compact device 40 is provided which is suited for a large number of illuminating purposes. Since the same is of flat and compact construction, it may be used when attached to a wall or suspended from a ceiling as a lighting fixture. It may also be mounted upon a stand to form a desk or table lamp. The uniformly lit front or outer surface 49 may have placed thereon all kinds of transparent or translucent pictures or devices, for example, "Kodachrome" transparencies, X-ray films or stencils, so that the cut out portions thereof may be uniformly illuminated.

Turning now to the second embodiment illustrated in Figures 3 and 4, it will be seen that it is substantially of the same construction shown in Figures 1 and 2 with the exception that a layer of silvering, forming a silvered area 51, is placed upon the outer surface of the disperser 42'. The rest of the parts correspond to those of the first embodiment and, for the purpose of avoiding needless repetition, are given reference characters corresponding to the first embodiment with a single prime mark added.

The device 40' thus forms an excellent illuminated mirror for shaving or applying cosmetics and, although only a single light source is used, namely the fluorescent tube 44', the illumination emitted from the areas 52, 53, 54 and 55 is directly proportional to the size of said areas and has a substantial uniform surface density.

It may be noted at this point that where, for some special reason, it is desired that any one of the areas 52 to 55 inclusive emit a greater quantity of light, or a lesser quantity of light, than any of the other areas, such particular area may have the roughness of the surface thereof increased or decreased accordingly.

With a slight loss in illumination of the areas 52 to 55 inclusive by reason of the loss of light reflected from the inner surface of the back plate 50', the said back plate 50' may be eliminated and the device 40' may have a double use. The face having the silvered area 51 being usable as a mirror, while the other or rear surface of the disperser 42' may serve as an illuminating medium.

Turning now to the third embodiment of the invention illustrated in Figures 5 and 6, the device 60 is of such construction that the intensity of the illumination emitted by the front surface 69 of the disperser 62 may be controlled without appreciably affecting the color quality of the light emitted therefrom.

The casing 61 includes generally an illuminator housing 63 and a disperser supporting frame 65. The illuminator housing 63 is preferably substantially cylindrical in shape and contains the illuminator 64.

The illuminator 64 is preferably an elongated fluorescent tube electrically energized. The illuminator 64 includes terminals 76 and 77 which are adapted to be engaged by sockets 78 and 79. The sockets 78 and 79 are suitably connected by means of the conductors 80 and the necessary auxiliary (not shown) may be placed in circuit with said conductors and the source of electrical energy. The sockets 78 and 79 and the illuminator 64 are removable as a unit from the illuminator housing 63 by reason of the fact that the end wall 67 is pivotally mounted by means of the hinge 81. The end wall 67 is maintained in the closed position thereof by means of a tab 82 which frictionally engages the inner surface of the illuminator housing 63 thereto adjoining. The opposite end wall 68 of the illuminator housing 63 is permanently connected to the end of said housing. The illuminator 64 is maintained in the operative position thereof, that is equidistantly spaced from the cylindrical inner surface of the housing 63 by means of support pins 83 and 84 on the inner opposed surfaces of the end walls 67 and 68 respectively, which engage corresponding depressions in the outer surfaces of the sockets 78 and 79.

As best seen in Figure 5, the cylindrical portion of the housing 63 is provided with an elongated slot which forms an exit through which light rays may leave the housing 63. The disperser supporting frame 65 includes a top wall 85, side walls 86 and 87 and a rear wall or back plate 70. The forward edges of the top wall 85 and the side walls 86 and 87, as well as the portion 88 of the housing 63, are provided with an annular peripheral channel 89 which is adapted to hold a transparency 100. While in such construction the transparency 100 would be permanently maintained in place, it is, of course, obvious that one of the sides of the channel 89 may be removable to permit the removal and replacement of other transparencies within the transparency holding means formed at the annular channel 89. Disposed between the innermost surface of the channel 89, the inner surface of the top wall 85 and the side walls 86 and 87 and the inner surface of the back plate 70 is the disperser 62 which is of composite construction including a plurality of disperser elements 91, 92, 93, 94 and 95. The disperser elements are each preferably of planar form and in the present embodiment, are preferably oblong in shape. The disperser elements 91—95 are composed of light transmitting material such as glass or Lucite and each, on one or more surfaces thereof, is provided with a plurality of light reflecting or refracting means, indicated generally by numeral 101. These light reflecting or refracting means may take the form of surface undulations or roughenings produced, for example, by grinding, lapping or sand-blasting the said disperser elements. Or, the disperser elements may have the surfaces thereof roughened by exposure to mediums which will attack the substance of which the disperser elements are composed, as for example in the case of glass, hydrofluoric acid fumes.

As has been described hereinabove and will be more fully set forth below, the light reflecting or refracting means or elements 101 on the surfaces of the disperser elements may be distributed or arranged on said surfaces in varying number and arrangement so that the concentration thereof is uniform on one of said surfaces and on the remainder of said surfaces is greater at the portions of the disperser elements most distant from the source of illumination.

The illuminator housing 63 is provided with two pairs of circumferentially arranged slots. The first pair being indicated by numerals 96 and 97 in Figure 5, and of the other pair, only the forwardmost one 98 is seen. An illumination intensity regulator plate 102 has the shape of an incomplete cylinder, extending through approximately 180°. At each of the two ends of said plate 102 there is provided a pair of headed posts. In Figure 5 are seen the posts 103 and 104, forming a first pair. In Figure 6 only one of the posts, 105 of second pair, is seen. The regulator plate 102 is provided with an elongated slot 106 which is preferably substantially as long as the illuminator 64 and is as wide as the total thickness of the disperser 62. The plate 102 is thus rotatably mounted about the horizontal central axis of the illuminator 64 by means of the posts 103—105 which ride in the slots 96—98. The outer surface of the regulator plate 102 may thus preferably slidably contact the inner curved surface of the housing 63 while the heads on the posts 103—105 maintain the said plate 102 in proper operative position. The edge of one or more of the slots, as for example, as indicated by numeral 107, may be slightly serrated and provided with graduations.

It may thus be seen that by rotating the regulator plate 102 about the longitudinal central axis of the illuminator 64 that the slot 106 acts in cooperation with the exit 108 from the illuminator housing 63 as a manually adjustable diaphragm. Movement of the regulator plate 102 will control the total number of disperser elements 91—95 which are receiving edge illumination at any one time. Since the quantum of light entering the disperser 62 is controlled without affecting the temperature or other operating characteristics of the illuminator 64, the total intensity of illumination being cast by the disperser through the transparency 100 may be desirably controlled without affecting the color characteristics of the light being cast outwardly from the transparency.

The inner surfaces of the casing 61 may be coated with a light reflecting substance or may be plated, or the casing itself may be composed of a material having light reflecting qualities.

Where, for certain purposes, it is desired to control the intensity of illumination passing through certain areas of the transparency, it is feasible in a modified construction not shown to arrange the light reflecting or refracting elements 101 in such a way as to accentuate the illumination cast by the disperser 62 in certain areas. Thus, rotation of the control plate 102 would then not control the total intensity of the illumination, but would rather control the area or portions on the transparency which are most brilliantly lit.

In an alternate construction, the width of the slot 106 may be reduced so that the same is equal to only one of the disperser elements 91—95. Thus, rotation of the control plate 102 would result in a selective illumination of any desired one of said disperser elements. With such a construction, it would be possible to have a relatively intense spot or portion of light move to different positions on the exposed face of the disperser 62, and correspondingly to selectively illuminate most brilliantly certain portions of the transparency 100.

Turning now to the fourth embodiment of the invention, there is illustrated in Figures 7 to 10 inclusive another form of disperser, indicated generally by numeral 112. The disperser 112 is particularly adapted for obtaining at a relatively high rate of efficiency a large portion of the total usable amount of light emitted from a point source of light indicated schematically by numeral 113. The disperser 112, itself, is preferably cast, molded or formed in the shape shown in said figures and includes the front face 119, the rear surface 120, the end surface 121 and the recess 122.

The front face 119 is preferably planar while the rear surface is of a generally concave configuration best seen in the sectional views in Figures 8, 9 and 10. The recess 122 is preferably of less diameter than the total thickness of the disperser 112 in the portion of the disperser where said recess is located. Said recess 122 has a cylindrical side wall 123 and the inner end or bottom thereof is preferably hemispherically concave.

Both the front surface 119 and the rear surface 120 are provided with a plurality of light reflecting or refracting elements generally indicated by numerals 124 and 125, and the arrangement thereof is such as to produce a substantially uniform illumination on the front face 119 as has been previously described. The form of the disperser 112 is particularly suited for use with small concentrated filament flashlight bulbs having a glass lens integral with the tip of the bulb, by reason of the fact that the whole glass or light emitting portion of such bulb (not shown) may be inserted within the recess 122. In order to achieve the proper uniformly distributed illuminating effect, it is desirable to shield the front face 119 immediately adjacent the bulb in the recess 122. By proper graduation or arrangement of the light reflecting or refracting elements 124 and 125, the remaining front face 119 may have a substantially uniform illumination.

Turning now to the fifth embodiment of the invention illustrated in Figure 11, a device 130 is shown which is particularly adaptable for illumination of a nature cast by lighting fixtures and lamps. In the device 130, the disperser 132 really forms two separate principal dispersing elements 133 and 134, which are of wedge shape tapering away from the illuminator 131, which is preferably a fluorescent tube. The two wedge shaped dispersing elements 133 and 134 are joined at the bases thereof and are provided with a transversely disposed cylindrical orifice 135. In addition, where it is desired that the exposed illuminating surfaces cast light of uniform intensity thereover, the addition of the shields 136 and 137 is made. The disperser elements 133 and 134 are composed of light transmitting material and are provided with a plurality of light reflecting and refracting elements 138, 139, 140 and 141. As may be seen in Figure 11, the concentration of said elements 138—141 is increased toward the apices of said wedge shaped dispersing elements 133 and 134, so that each of the exposed surfaces of the disperser 132 have a substantially uniformly lit surface.

Turning now to the sixth embodiment of the invention illustrated in Figures 12, 13 and 14, another form of disperser, indicated generally by numeral 152, is shown. The disperser 152 includes a plurality of disperser elements 153, 154, 155, 156 and 157. As may be seen in the drawings, disperser 152 is formed as a single integral unit and the disperser elements 153—157 are each spaced and parallel. They are thus integrated at the ends thereof nearest the light source 158 by means of the connecting portion 159. The upper surface 160 may be provided with a uniformly distributed arrangement of light reflecting and refracting means 161, while the upper surfaces only of the disperser elements 153—157 are provided with light reflecting and refracting elements only within a predetermined area. As seen in Figure 12, these areas are graduated in size and the concentration of the light reflecting and refracting elements 161 is uniform in each area. A substantially uniform illumination over the entire area of the upper surface 160 is obtained by reason of this graduation in size of the said areas. The areas are disposed at the portions of the areas containing the light reflecting and refracting elements 161 and are disposed in the portions of the disperser elements 153—157 most removed from the light source 158.

As seen in Figure 14, the edge 165 of the area 164 containing the light reflecting and refracting elements nearest the light source is arranged so that all parts of said edge 165 are equi-distant from the light source 158. Where the light source, instead of being a point light source, is a "line" light source, as in the case of a fluorescent tube, the edge 165 may, of course, be straight.

The conductors 166 and 167 and the battery 168 form the usual circuit to the source of illumination 158.

The disperser 152 may be placed in any suitable container or casing similar, for example, to that shown in Figure 19.

Turning now to the seventh embodiment of the invention illustrated in Figure 15a, a disperser, generally indicated by numeral 172, is similar to the disperser 152 with the exception that the portions of the disperser elements 173, 174, 175, 176 and 177, which are free, are graduated. This results in an increased size of the connecting portion 179. The upper surface 180 may be uniformly roughened. The rear or bottom surface 182 may also be uniformly roughened. The graduated free areas of the disperser elements 173—177 provide the equalizing factor so that the distribution of illumination of the surface 180 is substantially uniform. The disperser 172 may, for example, in accordance with one mode of construction, be fabricated from a single block of light transmitting material such as Lucite, and the slots between the disperser elements 173—177 may be simultaneously formed by sawing with blades of varying depth. The sawing, of course, being initiated at the end 183, the light reflecting and refracting elements 181 being formed automatically by the roughness caused by the saw kerf.

In the eighth embodiment of the invention illustrated in Figures 15b and 16, a form of disperser, indicated generally by numeral 192, is shown, which is adapted for receiving light from the light sources 193 and 194 at the opposite edges thereof. The disperser 192 is composed of a plurality of sheets of transparent material, each forming one of the disperser elements 195 to 199 inclusive. The device 190 has the upper surface 200 preferably uniformly roughened while the light reflecting and refracting elements, generally indicated by numeral 201, on the upper surface of each of the disperser elements 196 to 199 are arranged in predetermined areas, graduated from the center between the two light sources outwardly toward said light sources. Thus, as best seen in Figure 16, the light reflecting and refracting elements 202 are disposed substantially in the center of the top surface 203 of the disperser element 199. The light dispersing and refracting elements 204 located at the top surface of the disperser element 198 are disposed in an area centrally of said disperser element, yet said area is of greater size than the area occupied by the elements 202. This enlargement of the area occupied by the light reflecting and refracting elements is also increased in the disperser element 197, and again on 196. The device 190 thus is of substantially identical construction in opposite directions from either the longitudinal or transverse axes thereof. If the light sources 193 and 194 are of equal intensity and are symmetrically positioned with relation to the last described axes, illumination over the upper surface of the disperser element 195 will be substantially uniform.

The disperser unit 192 may be placed in a suitable casing, for example, similar to that shown in the Figure 19, with the exception that another illuminator housing would have to be provided for the additional source of illumination. It may be noted in connection with this embodiment, that the edges of the areas containing the light reflecting and refracting elements, nearest the light source, are curved to be equidistant from said light sources, which are in point form.

From a perusal of the construction shown in Figures 15b and 16, it will be apparent that additional light sources may be used by making a corresponding change in the size and positioning of the areas containing the light reflecting and refracting elements. For example, if the device 190 were to be circular in form, taking the shape of a disc, and if the same were to be illuminated by an annular fluorescent tube placed around the periphery of said disc, the areas containing the light reflecting and refracting elements would be circular in form and centrally disposed on each of the layers and disperser elements. The areas would vary in size on each of the circularly shaped disperser elements so that the illumination existing over the entire surface of the front or topmost disperser element would be uniform.

In the ninth embodiment of the invention illustrated in Figure 17, the device, generally indicated by numeral 210, is of laminated construction. The disperser 212 includes a plurality of disperser elements 213, 214, 215, 216 and 217. The light source is indicated by numeral 218. As more or less diagrammatically indicated in Figure 17, the light reflecting and refracting elements 219 are placed in predetermined areas on each of the disperser elements. The disperser elements are of sheet form and the light reflecting and refracting elements 219 are placed on both opposite sides of each disperser element. In order to produce a more uniform dispersion of light on the top face 220 of the disperser 212, the areas containing the light reflecting and refracting elements 219 on the two sides of each of the disperser elements are of different size. Thus, the areas containing said light reflecting and refracting elements are arranged in steps between which the interval is reduced, as contrasted with other embodiments in which areas containing light reflecting and refracting elements are disposed only on one side of each of the light disperser elements, or in which the areas of both sides of the light disperser elements are of substantially equal size.

Figure 18 shows a tenth embodiment of the invention, indicated generally by numeral 230, having a plurality of light dispersing elements, generally indicated by numeral 231. The light source is indicated by numeral 233. The disperser 232 is thus wedge shaped, being made up of a stack of the disperser elements 231, which are of wedge shaped configuration. The surfaces of the light dispersing elements 231 may be treated in any of the ways described herein, such as variable density roughening or uniform density roughening in areas varying in size on the various disperser elements.

The principal advantages of the tenth embodiment lie in a saving in space and a saving in cost of the transparent material of which the disperser elements are composed. Where the disperser elements 231 are composed of a relatively expensive material, such as methyl methacrylate, the saving in cost may be considerable. As the light rays travel from the light source 233 outwardly therefrom, along each of the disperser elements, the light intensity becomes weaker in accordance with the well known law, so that, by converging the principal surfaces of the light disperser elements, light transmission efficiency is maintained with a gradually reduced size of the light disperser elements. Thus, the thickness of the disperser or the disperser elements is reduced in relation to the distance from the light source.

In Figure 19 there is seen a device, representing an illumination unit, which device is generally indicated by numeral 240, and includes a casing 241 and a disperser 242. The illuminator housing 243 is provided with an entrance 244 through which the illuminator (not shown) may be inserted. The disperser may be in one of the forms of disperser described herein and of a shape corresponding to the internal configuration of the casing 241. The principal purpose of the casing is to confine all of the light emanating from the illuminator within the casing and to direct or reflect the same into the disperser which evenly distributes it so that the upper surface or working face 249 shall be uniformly lit.

The eleventh embodiment of the invention is illustrated in Figure 20 and is indicated generally by numeral 250. The device 250 includes a casing 251, adapted to contain a light source 254, and a pair of dispersers 252 and 253. The casing 251 also contains a source of electrical energy in the form of dry cells 255.

The dispersers 252 and 253 are arranged back to back and the outer surfaces thereof 256 and 257 may have outwardly thereof transparencies 258 and 259 respectively. The dispersers 252 and 253 may be of any of the constructions described herein and as shown in Figure 20, are of the multilamination type. In accordance with the eleventh embodiment, the width of each of the disperser element or laminations in each series is reduced so that a saving in weight, size and material is obtained. In order to obtain uniform illumination on the working surfaces 256 and 257, the number of light reflecting and refracting elements on the wider disperser elements or laminations in each series is increased, along the longitudinal edges thereof.

By means of the construction shown in Figure 20, a very compact and useful device is obtained for the simultaneous illumination of two oppositely disposed transparencies utilizing a single source of electrical energy as well as a single illuminator. In the operation of this construction, each of the transparencies will be uniformly illuminated in a desirable manner. The external appearance of both the front and rear elevational views of a device made in accordance with the construction shown in Figure 20 may be identical.

Turning now to the twelfth embodiment of the invention illustrated in Figures 21 to 31 inclusive, the device is generally indicated by numeral 300. The device 300 includes generally a casing 301, a light dispersing unit 302, an illuminator 304 and a power supply 303.

The light dispersing unit 302 includes a disperser 305 and a disperser casing therefor 313. The disperser is preferably formed of a single piece of light transmitting material such as methyl methacrylate, having a light entering surface 307, a light emitting surface 308 and a rear surface 309. The light entering surface 307 and the light emitting surface 308 are preferably disposed at right angles to each other and are preferably plane. The rear surface 309 is convexly curved between the side edges 310 and 311 while said rear surface 309 gradually tapers from the rear edge of the light entering surface 307 to the top edge 312 of the light emitting surface.

The disperser 305 has a casing 313 therefor, which is of irregular configuration, best seen in Figures 25, 27, 28 and 29 of the drawings. The casing 313 and the disperser 305 form the light disperser unit 302.

Th casing 313 is preferably formed from sheet material such as metal or the same may be molded from plastic, and includes a rounded illuminator reflector portion 314, side walls 315 and 316, a bottom wall 317, a top front wall 318, a bottom front wall 319 and a pair of oppositely disposed transparency retaining flanges 320 and 321. The side walls 315 and 316, and the bottom wall 317 converge rearwardly, while the reflector portion 314 is rounded. The top front wall is connectively associated with the side walls 315 and 316 by means of the tabs 322 and 323. The side wall 315 is provided with an illuminator entrance orifice 324. The disperser 305 may be inserted within the casing 313 prior to the connection of the tabs 322 and 323 to the corresponding side walls 315 and 316 so that when said tabs are connected, the upper portion of the disperser 305, that is, the portion adjacent the light entering surface 307, is frictionally maintained in position.

The surfaces 308 and 309 of the disperser are provided with a plurality of light reflecting and refracting elements 325, which may be formed thereon by roughening said surfaces. The roughening is so arranged that the concentration thereof is increased gradually toward the far end 312 of the disperser 305. This results in a uniform illumination on the light emitting surface 308. A transparency 326 may be sandwiched between two cover glasses 327 and 328, or the transparency may be used without the cover glasses. This "sandwich," illustrated in Figure 24, or the transparency unmounted or otherwise suitably mounted is adapted to be retained upon the light emitting surfaces 308 by means of the flanges 320 and 321.

The casing 301 includes generally two parts, a cover member 330 and a back member 331. The cover member is in the form of a hollow flat cup including the front wall 332, a top wall 333, a bottom wall 334 and side walls 335 and 336. The front wall 332 is provided with a rectangular orifice 337 and a pair of spaced transparency positioning ribs 338 and 339. The orifice 337 is adapted to frame the surface 308 while the ribs 338 and 339 are adapted to properly position a "Kodachrome" or similar transparency in a standard mounting therefor. In use, a pair of outer opposed edges of a mounted transparency 340, indicated in dot-dash lines on Figure 21, slidably engage the inner opposed faces of the ribs 338 and 339. Obviously, when a transparency such as the transparency 340 is placed upon the outer surface of the front wall 332, the transparency 341 should be removed. Thus, when a transparency such as 341 is used, the device 300 becomes a carrier and illuminator for the transparency 341, while, when the transparency 341 is removed, the device 300 becomes a portable illuminator for various transparencies placeable upon the front wall 332.

The back member 331 is of generally flattened cup shape and includes a rear wall 342, a top wall 343, a bottom wall 344 and side walls 345 and 346.

Substantially centrally disposed and symmetrical with relation to the vertical axes of the back member 331, is a disperser and dry cell supporting structure 347. This structure may be integrally connected to the rear wall 342. The back member 331 is preferably composed of an insulating material and the configuration thereof is such that when the same is molded from a material such as "Tenite," the same may be molded in one piece. The supporting structure 347 includes the longitudinally directed, spaced and parallel members 348 and 349. The members 348 and 349 have the surfaces thereof elevated and irregularly shaped as they approach the bottom wall 344, so that they may engage the rear portions of the disperser casing 313 as best seen in Figures 30 and 31. The cross-pieces 350 and 351 also engage the back of the disperser casing 306. The cross-pieces 350 and 351 extend outwardly of the members 348 and 349 to form the extensions 352, 353, 354 and 355. These extensions serve to assist in the positioning of the dry cells 356 and 357. The juncture of the lower ends of the members 348 and 349 with the inner surface of the bottom wall 344 is provided with a transversely disposed slot 358 within which is disposed the resilient connector strip 359.

The upper ends of the members 348 and 349 are provided with outwardly extending extensions 360 and 361, which serve to maintain the upper ends of the dry cells 356 and 357 respectively, in position against the resilient inwardly bent ends 362 and 363 and the strip 359. The extensions 360 and 361 are perhaps best seen in Figure 30.

The illuminator 304 includes an incandescent bulb 365 and a mounting and connecting unit 366. The mounting and connecting unit 366 comprises a socket shell 367, a connector strip 368 having a switching portion 369, a cell connecting strip 370, an insulating strip 371 and a rivet 372. The rivet 372 makes electrical contact with the strip 368 and the central contact (not shown) of the incandescent bulb base. The strip 370 makes electrical contact with the socket shell 367. The rivet 372 serves to mechanically associate the strip 368, the insulating strip 371, the cell connecting strip 370 and the socket shell 367.

The top wall 343 is provided with a horizontally disposed slot 373 adapted to receive the strip 368, while the side wall 345 includes a depression within which the rivet 372 becomes seated. Thus, as seen in Figures 23 and 26, the unit 366 is maintained vertically in place by the upward pressure on the strip 370 caused by the cell 356. The unit 366 is maintained horizontally by compression between the side wall 345 and the plunger or switch button 375. Propecting perpendicularly from the inner surface of the rear wall 342 is a wedge or cam switch element 376. The switching portion 369 of the strip 368 has the inner end thereof in slidable contact with the cam element 376. By reason of the configuration of the cam 376 and the switching portion 369, as best seen in Figures 23 and 26, inward manual pressure on the push button 375 will cause the portion 369 to be moved inwardly, and simultaneously moved downwardly so that the portion 369 will contact one of the electrical terminals of the dry cell 357.

Thus, starting from the positive terminal 377 of the dry cell 356, the electrical circuit travels via the strip 359, the cell 357, the portion 369, the strip 368, the rivet 372, the bulb 365, the base of the bulb, the socket shell 367, the connector 370, back to the cell 356.

One mode of assembly of the device is as follows. The dry cells 356 and 357 are placed within the back member 331 and either the unit 366 is put in place as a separate operation and subsequently the disperser and casing is slipped over the bulb 365 by inserting the bulb into the orifice 324, or the unit 366 and the disperser casing 306 are associated first and then placed into the back member 331 together. As previously described, a transparency 326 may be placed within the flanges 320 and 321 or the transparency may be placed on top of the cover member 330 later. The cover member 330 is preferably composed of a material having a slight degree of resiliency so that the same may be maintained in place by forcing the grooved side walls 335 and 336 into engagement with the correspondingly formed upper lateral edges of the side walls 345 and 346, as best seen in Figure 30.

The removal of the cover member 330 for the purpose of replacing a transparency or the removal of the disperser casing 306 for the purpose of replacing the dry cells or the bulb thus becomes a simple matter.

By reason of the fact that the device 300 is extremely compact and flat, it is highly portable and convenient in use.

It may thus be seen that we have disclosed novel light dispersing means as well as structures combining such dispersing means for advantageous and convenient use. Devices made in accordance with the present disclosure provide novel and useful results by means of structure which is more compact and lighter in weight than that heretofore used.

In the various embodiments disclosed, some have a single disperser element and others have a plurality of disperser elements combining to make a disperser or a single disperser unit. In the case of those embodiments in which a uniform illumination is obtained over the upper face of the disperser by means of varying the concentration of the light reflecting and refracting elements, the resultant evenness of illumination will depend upon the proper arrangement of said light reflecting or refracting elements so that the same taper or are reduced in concentration as they approach the light source in comparative ratio to the diminution of light as it travels from the source. By careful arrangement of the light reflecting and refracting elements, a proper balance may be procured so that even illumination is obtained uniformly over the working surface or front face of the disperser.

Where the dispersers are composed of a plurality of laminations, each having a definite area in which the light reflecting and refracting elements are placed, and said light reflecting and refracting elements are uniformly arranged over said area, then the degree of uniformity will, to some extent, be affected by the number of such laminations. While a greater number of laminations will create a more uniform dispersion of light, it has been found desirable not to have too many laminations, as too much light becomes absorbed, thereby reducing the over-all efficiency of the device. Increasing the number of laminations excessively, will also increase the thickness where the laminations are not changed in thickness. It has been found undesirable to increase the total thickness of the disperser unit beyond the thickness of the light source and the reflector used therewith. For example, if a light source with its reflector has a light exit of one inch in thickness, it is desirable that the disperser unit have a thickness of one inch. The total number of laminations in the laminated type disperser may then be varied in accordance with the uniformity of light dispersion desired and the cost involved, since, ordinarily, more laminations will require more labor to fabricate them.

While in the prior art numerous efforts have been made to secure a translucent plate which is uniformly illuminated over the entire surface thereof by means of a point light source or a rod light source placed therebehind, the constructions resulting from these efforts have been open to a number of objections. In the first place, where the point source of light is located relatively close to the rear surface of the translucent plate, a "hot spot" of light appears on the translucent plate owing to inadequate dispersion or distribution of the light from said point source. Where the light source is in the form of a rod or line, the "hot spot" takes the form of a "hot line."

In order to create a greater dispersion and, therefore, uniform distribution of the light, the density of the light reflecting and refracting particles in the translucent plate is increased so that when a condition of uniform light distribution is approached, the relative opacity of the translucent plate is so great that the efficiency is tremendously reduced.

Where a more uniform dispersion or distribution of the light is obtained by removing the light source a considerable distance from the rear surface of the translucent plate, since the light must travel a great distance, there is a considerable loss in efficiency, and in the removal of the light source to a point distant from the translucent plate, the dimensions of the entire device are increased. This results in greater bulk, weight and inconvenience in use.

We wish it to be understood that we do not desire to be limited to the exact details of construction shown and described, for obvious modifications will occur to a person skilled in the art.

We claim:

A device for viewing transparencies comprising, a casing having a viewing orifice; a source of illumination in said casing; a disperser comprising a body of light transmitting material having first and second opposed principal surfaces and an edge portion of substantial thickness; said source of illumination being positioned with relation to said edge portion as to cast light rays into the said edge portion and into said body; a plurality of light reflecting and refracting elements on each of said surfaces; said light reflecting and refracting elements being distributed entirely over said surfaces and being disposed in concentration increasing in proportion to the distance from the light source; said disperser having one of its principal surfaces adjacent said viewing orifice to transmit light from the light from the light source outwardly through said viewing orifice.

GENEVA BANDY CHRISTENSEN.
CHRISTIAN CHRISTENSEN.